US008019541B2

(12) United States Patent
Cohen et al.

(10) Patent No.: US 8,019,541 B2
(45) Date of Patent: Sep. 13, 2011

(54) REAL-TIME DATA AIDING FOR ENHANCED GPS PERFORMANCE

(75) Inventors: Clark Cohen, Washington, DC (US); Bart Ferrell, Troy, IL (US); Greg Gutt, Leesburg, VA (US); David Whelan, New Port Coast, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/910,451

(22) Filed: Oct. 22, 2010

(65) Prior Publication Data

US 2011/0032144 A1    Feb. 10, 2011

Related U.S. Application Data

(62) Division of application No. 10/873,581, filed on Jun. 22, 2004, now Pat. No. 7,904,243.

(60) Provisional application No. 60/536,788, filed on Jan. 15, 2004.

(51) Int. Cl.
    *G01S 19/11* (2010.01)
(52) U.S. Cl. ........ 701/215; 701/207; 701/213; 701/214; 342/353; 342/357.22; 342/357.39; 342/357.42; 342/357.47; 342/357.48
(58) Field of Classification Search .................. 701/200, 701/207, 213, 214, 215, 216; 342/353, 357.21, 342/357.22, 357.28, 357.29, 357.39, 357.395, 342/357.4, 357.42, 357.47, 357.48, 357.59
See application file for complete search history.

(56) References Cited

U.S. PATENT DOCUMENTS

| 5,345,245 | A | * | 9/1994 | Ishikawa et al. | 342/357.21 |
|---|---|---|---|---|---|
| 5,886,666 | A | * | 3/1999 | Schellenberg et al. | 701/3 |
| 5,944,770 | A | | 8/1999 | Enge et al. | |
| 6,040,798 | A | * | 3/2000 | Kinal et al. | 342/357.21 |
| 6,138,074 | A | * | 10/2000 | Gower et al. | 701/215 |
| 6,178,195 | B1 | * | 1/2001 | Durboraw et al. | 375/136 |
| 6,236,359 | B1 | * | 5/2001 | Watters et al. | 342/357.29 |
| 6,246,363 | B1 | | 6/2001 | Yung et al. | |
| 6,252,545 | B1 | | 6/2001 | Da et al. | |
| 6,373,432 | B1 | * | 4/2002 | Rabinowitz et al. | 342/357.29 |
| 6,377,208 | B2 | | 4/2002 | Chang et al. | |
| 6,674,398 | B2 | | 1/2004 | Murphy | |

(Continued)

FOREIGN PATENT DOCUMENTS

GB    2293710 A    4/1996

OTHER PUBLICATIONS

GPS Pseudolites: Theory, Design, and Application; Cobb, H. Stewart; Sep. 1997; http://waas.stanford.edu/~wwu/papers/gps/PDF/Thesis/StewartCobbThesis97.pdf.

(Continued)

*Primary Examiner* — Khoi Tran
*Assistant Examiner* — Spencer Patton
(74) *Attorney, Agent, or Firm* — Yee & Associates, P.C.

(57) ABSTRACT

Data from GPS satellites within the field of view of a ground station are retransmitted to LEO satellites, such as Iridium satellites, and cross-linked if necessary before being transmitted to a user. The user is then able to combine the fed-forward data with data received directly from GPS satellites in order to resolve errors due to interference or jamming. Iridium and data aiding thus provides a means for extending GPS performance under a variety of data-impaired conditions because it can provide certain aiding information over its data link in real time.

20 Claims, 10 Drawing Sheets

U.S. PATENT DOCUMENTS

| | | |
|---|---|---|
| 7,027,918 B2 | 4/2006 | Zimmerman et al. |
| 7,054,593 B2 | 5/2006 | de La Chapelle et al. |
| 2001/0045903 A1 | 11/2001 | Chang et al. |
| 2002/0058478 A1 | 5/2002 | de La Chapelle et al. |
| 2002/0193108 A1 | 12/2002 | Robinett |
| 2004/0210389 A1 | 10/2004 | Zimmerman et al. |

OTHER PUBLICATIONS

USPTO Office Action for U.S. Appl. No. 10/873,581 dated Sep. 10, 2007.

USPTO Office Action for U.S. Appl. No. 10/873,581 dated Apr. 30, 2008.

USPTO Office Action for U.S. Appl. No. 10/873,581 dated Nov. 13, 2008.

USPTO Final Office Action for U.S. Appl. No. 10/873,581 dated Nov. 6, 2009.

USPTO Office Action for U.S. Appl. No. 10/873,581 dated Feb. 4, 2010.

USPTO Final Office Action for U.S. Appl. No. 10/873,581 dated Jul. 21, 2010.

* cited by examiner

REAL-TIME DATA AIDING FOR ENHANCED GPS PERFORMANCE

CROSS-REFERENCED TO RELATED APPLICATIONS

This application is a divisional of application U.S. Ser. No. 10/873,581, filed Jun. 22, 2004, now U.S. Pat. No. 7,904,243, and which claims priority to U.S. Provisional Application No. 60/536,788, filed on Jan. 15, 2004.

BACKGROUND INFORMATION

1. Field

This invention relates generally to systems for enhancing global positioning system performance.

2. Background

GPS, or Global Positioning System, is funded by and controlled by the U.S. Department of Defense (DOD). While there are many thousands of civil users of GPS world-wide, the system was designed for and is operated by the U.S. military. GPS provides specially coded satellite signals that can be processed in a GPS receiver, enabling the receiver to compute position, velocity, and time. Four GPS satellite signals are used to compute positions in three dimensions and the time offset in the receiver clock.

The GPS satellites transmit two microwave carrier signals. The L1 frequency (1575.42 MHz) carries the navigation message and the Satellite Positioning Service (SPS) code signals. The L2 frequency (1227.60 MHz) is used to measure the ionospheric delay by Precise Positioning System (PPS) equipped receivers.

Three binary codes shift the L1 or L2 carrier phase. The C/A Code (Coarse Acquisition) modulates the L1 carrier phase. The C/A code is a repeating 1 MHz Pseudo Random Noise (PRN) Code. This code modulates the L1 carrier signal, spreading the spectrum over a 1 MHz bandwidth. The C/A code repeats every 1023 bits (one millisecond). Each satellite has a different PRN C/A code, and GPS satellites are often identified by their PRN number, the unique identifier for each pseudo-random-noise code. The C/A code that modulates the L1 carrier is the basis for the civil SPS.

Authorized users with cryptographic equipment and keys and specially equipped receivers use the Precise Positioning System, or PPS. Authorized users include U.S. and allied military, certain U.S. Government agencies, and selected civil users specifically approved by the U.S. Government. In the PPS, the P-Code (Precise) modulates both the L1 and L2 carrier phases. The P-Code is a very long (seven days) 10 MHz PRN code. In the Anti-Spoofing (AS) mode of operation, the P-Code is encrypted into the Y-Code. The encrypted Y-Code requires a classified AS Module for each receiver channel and is for use only by authorized users with cryptographic keys. The P/Y Code is the basis for the PPS.

A Navigation Message also modulates the L1-C/A code signal. The Navigation Message is a 50 Hz signal consisting of data bits that describe the GPS satellite orbits, clock corrections, and other system parameters. The GPS Navigation Message consists of time-tagged data bits marking the time of transmission of each subframe at the time they are transmitted by the SV. A data bit frame consists of 1500 bits divided into five 300-bit subframes. A data frame is transmitted every thirty seconds. Three six-second subframes contain orbital and clock data. Satellite Vehicle (SV) Clock corrections are sent in subframe one and precise satellite orbital data sets (ephemeris data parameters) for the transmitting SV are sent in subframes two and three. Subframes four and five are used to transmit different pages of system data. An entire set of twenty-five frames (125 subframes) makes up the complete Navigation Message that is sent over a 12.5 minute period.

Ephemeris data parameters describe SV orbits for short sections of the satellite orbits. Normally, a receiver gathers new ephemeris data each hour, but can use old data for up to four hours without much error. The ephemeris parameters are used with an algorithm that computes the SV position for any time within the period of the orbit described by the ephemeris parameter set.

The C/A code is broadcast at 1,575.42 MHz in a 2.046 MHz wide band (complete null to null), and is used for civilian operations and for initial acquisition in military operations. The P/Y code is a wider-band signal spanning 20.46 MHz that provides 10 times higher ranging precision than C/A code commensurate with its higher chipping rate. Often, C/A code is the first casualty of jamming. The 1.023 MHz chipping rate of the C/A code provides some protection, but the 10.23 MHz chipping rate of the P/Y code offers an additional 10 dB of J/S protection. If the jamming is known to be narrow band and to originate within the C/A code frequency band so as to deny enemy use of the C/A code signal component, then even more protection is available by notch filtering the center 2 MHz of the P/Y code input to the receiver.

The ability to track low power GPS signals is important for a number of real-time applications, including cases where the GPS signal may be attenuated, jammed, or subject to interference. Previous approaches to these obstacles have included to varying degrees (i) signal processing to enhance sensitivity, (ii) controlled radiation pattern antennas (CRPAs) to thwart jamming, and (iii) control of the receiving environment, if possible, to ward off interference. Unfortunately, in many of these cases, only limited performance improvement is feasible due to practical constraints.

In the case of (i) signal processing, the fundamental limit to increased performance is established by the data bit boundaries in the GPS message. The intrinsic GPS data broadcast rate is 50 bits per second. Ordinary receivers cannot integrate the signal across these 20 ms intervals. Extension of the integration interval would actually lead to a decrease in performance because the data bits will appear as random noise that averages to zero. Therefore, a general practical limit is 20 ms averaging.

Some practitioners have tried to push this limit by squaring the GPS signal. However, squaring is an inefficient means of recovering information because the noise is mixed with itself, resulting with a significant baseband noise component superimposed over the squared signal at baseband. Other techniques have been devised that employ data stripping—the local application of limited a priori knowledge of the GPS bit sequence that takes advantage of a tendency in GPS to often repeat the same sequence multiple times—in order to remove the GPS data and obtain longer integration times. Unfortunately, this technique can often provide marginal results—especially in critical applications. The main shortcoming is that it completely falls apart when the GPS message changes, and this occurrence is frequent and unpredictable.

Prior processing efforts have also taught away from the current invention of employing feed-forward data to enhance performance. For example, U.S. Pat. No. 6,133,874 teaches that, "Coherent integration beyond 20 milliseconds is normally inadvisable since the presence of a priori unknown 50 baud binary phase shift keyed data (the satellite data message) placed on top of the signal does not allow coherent processing gain beyond one data bit period, or 20 milliseconds." Similarly, U.S. Pat. No. 5,664,734 explains, "If the carrier frequency and all data rates were known to great precision, and no data were present, then the signal-to-noise ratio could be greatly improved, and the data greatly reduced, by adding to one another successive frames. The presence of 50 baud data superimposed on the GPS signal still limits the coherent summation of PN frames beyond a period of 20 msec."

Null steering antennas (ii) reduce jamming by identifying the direction of origin of a jammer, then spatially notching out all signals in that direction. What remains is the unjammed GPS signals that come from other directions. With additional phased array electronics, it is also possible to create more tightly focused beams on individual GPS satellites, thereby increasing signal strength. While the jamming protection of CRPAs is excellent, such antennas are often heavy, bulky, and expensive.

Last, controlling the receiving environment to minimize interference sources (iii) is often involved because it must be carried out under a regulatory regime. For example, ultrawideband (UWB) devices have already been shown to interfere with certain GPS devices on occasion. There is a general desire to have both of these devices coexist—the potential user base is fundamentally the same. In the best of all worlds, a regulatory environment will exist that will enable UWB to coexist with GPS and other incumbent bands. However, in spite of best efforts to create and conform to such a regulatory environment, there will always be deviations that create exceptions to proper performance. It is for these cases that the invention described herein is likely to be most useful, namely, as a "safety net" against unexpected interference.

What is needed is a system that provides robust GPS performance under any of these adverse conditions with a simple solution that does not incur the associated penalties in terms of size, weight, power, and cost.

SUMMARY

In accordance with preferred embodiments of the present invention, data from GPS satellites within the field of view of a ground station are retransmitted to LEO satellites, such as Iridium satellites, and cross-linked if necessary before being transmitted to a user. The user is then able to combine the fed-forward data with data received directly from GPS satellites in order to resolve errors due to interference or jamming. Iridium and data aiding thus provides a means for extending GPS performance under a variety of data-impaired conditions because it can provide certain aiding information over its data link in real time.

Applications of the present invention include (but are not limited to) ultra-wide-band interference protection, anti-jam protection, and enhanced ability to use GPS indoors.

Ultra-Wide-Band (UWB) Interference Protection. Many consumer and business local networks are beginning to employ UWB for wireless communication. Because of its likely popularity among business travelers, UWB is also a candidate for air travel such as Boeing's Connexions service. Unfortunately, UWB also happens to be an interference risk to GPS since it is partially overlaid on the GPS frequencies. The GPS and aviation communities are making every effort through the FCC to create a regulatory guardband between GPS and UWB so that the two can coexist. But even with a regulatory guardband, it is possible that incidental UWB emissions onboard an aircraft could interfere with onboard GPS navigation equipment. Iridium data supplied in real time to the aircraft anywhere in the world would provide enough information to allow for continued tracking of the GPS signal—even in the presence of UWB interference.

Antijam Protection. Jamming in battlefield environments is also a key consideration. A stand-alone Y-code GPS receiver can typically withstand a Jamming to Signal (J/S) ratio up to 50 dB before it will lose lock. Iridium data supplied to a user receiver in real time could provide the user with significant enhancements in antijam performance over a stand-alone receiver.

Indoor Operations. The strong Iridium signal could be used to transmit aiding information in real time to a GPS receiver inside a building that can only access attenuated signals.

BRIEF DESCRIPTION OF THE DRAWINGS

The preferred and alternative embodiments of the present invention are described in detail below with reference to the following drawings.

DETAILED DESCRIPTION

Figure 1:
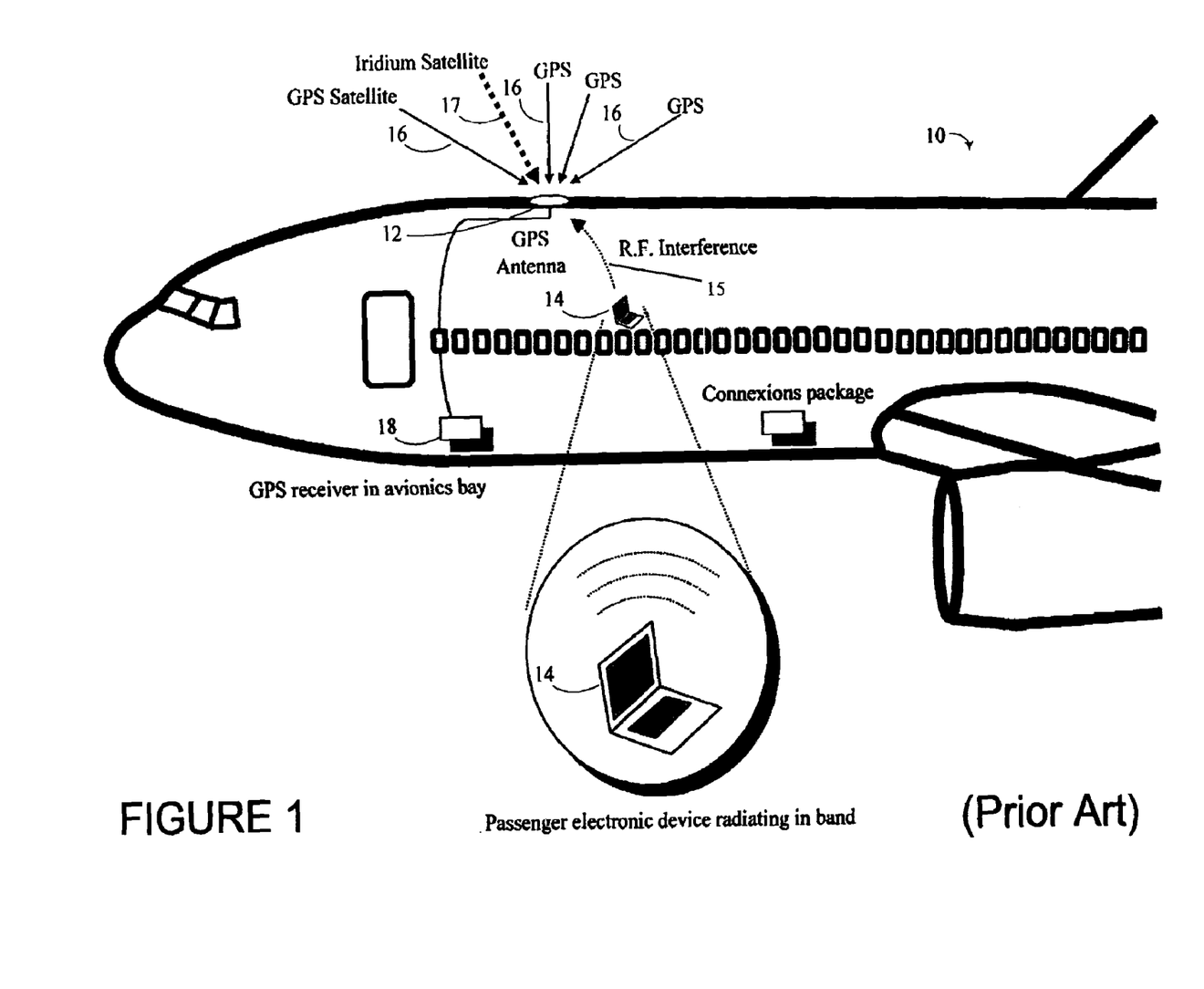
FIG. 1 is a representative view of an aircraft equipped with a GPS receiver and subject to interference.

FIG. 1 shows an example of a basic situation that could produce interference in a commercial passenger jet 10 equipped with a GPS antenna 12 and GPS receiver 18. The GPS antenna 12 is capable of receiving GPS signals 16 and LEO satellite signals 17 from those satellites within its field of view. If a passenger operates a portable electronic device 14 such as a notebook computer, it is possible that this device could emit interference 15 in the GPS band. Through a number of pathways, this interference can reach the GPS antenna on board the aircraft that is being used for navigation. Depending on its strength, the interference could render the GPS receiver useless, possibly jeopardizing the aircraft and its occupants.

The system described herein is directed towards maintaining carrier and pseudorange lock in the presence of interference, jamming, or reduced signal strength. Typical parameters required to acquire a GPS satellite include knowledge of its pseudorandom noise code phase, Doppler shift, and user clock offset. In the absence of data modulation on the GPS signal, for a given signal strength and uncertainty in acquisition parameters, there is a standard tradeoff between time to acquire and sensitivity. Since one purpose of this invention is to enhance receiver sensitivity, it does not address the acquisition of a signal except to assume that a receiver has already successfully locked onto a signal. Co-pending patent application Ser. No. 10/720,736 (which is hereby incorporated by reference) shows how such acquisition can be carried out under more demanding conditions when an additional 10 dB of processing gain is desirable. The present invention shows how a receiver may continue to track this signal when conditions drive it to be hardly detectable.

Figure 2:
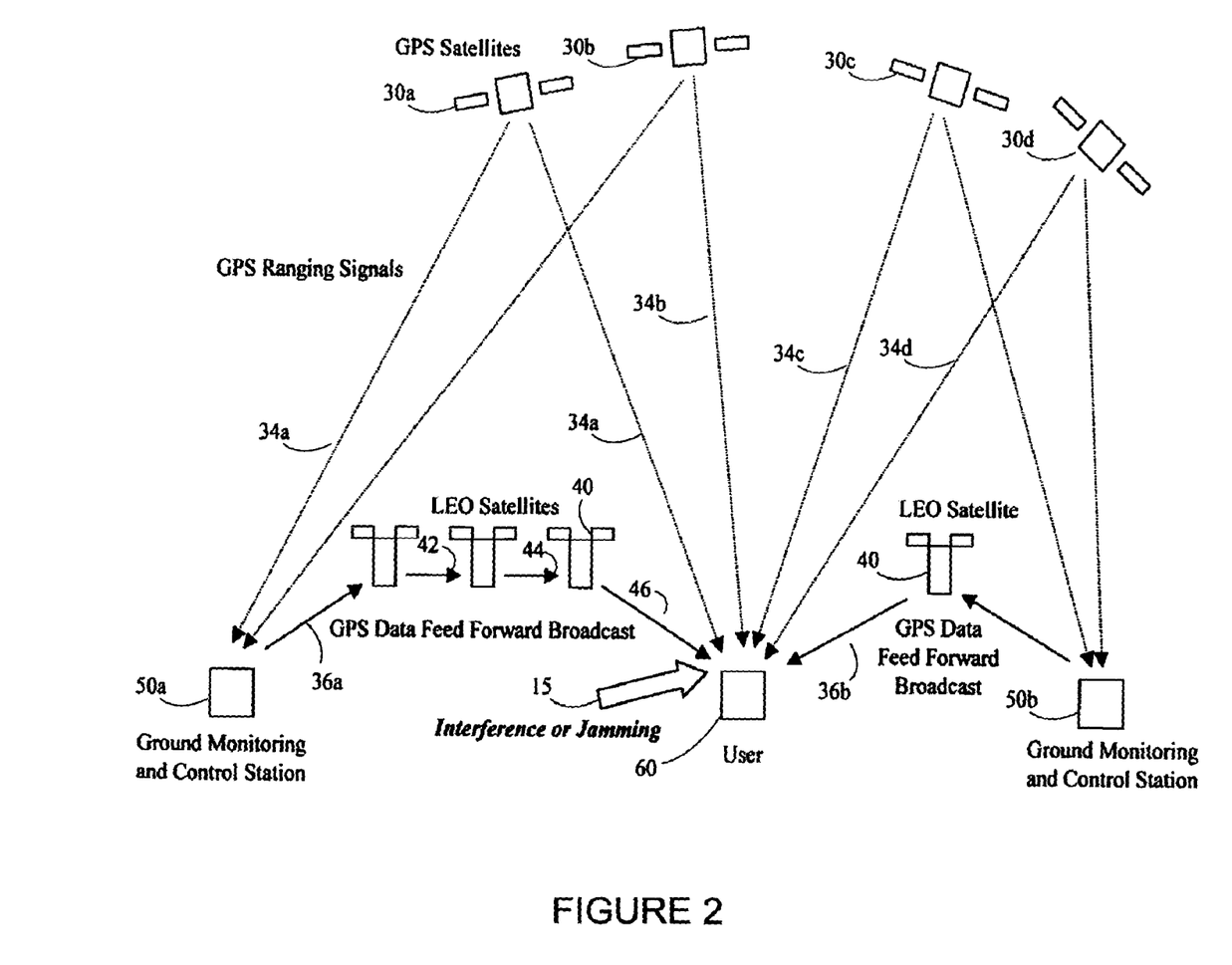
FIG. 2 is a representative view of a system in accordance with the present invention.

FIG. 2 shows the system architecture in a preferred embodiment of the invention. Reference GPS receivers 50 are placed on the Earth away from the region of degraded GPS signal conditions of interference, jamming, and attenuation. In a single application, only one or a plurality of such receivers 50 may be employed. These reference GPS reference receivers track the 50 bps GPS ranging signal data stream 32 for each satellite in view. A collocated Iridium ground transmitter telemeters a signal 34 containing this received GPS bit stream in real time into the Iridium system via the nearest satellite 40. The bit stream is encoded into an Iridium broadcast channel, an example of which is the Iridium "visit message." This broadcast message 36a is promulgated throughout the Iridium network via its crosslinks 42, 44. Iridium broadcasts the 50 bps real time data stream for each GPS satellite from each satellite in the Iridium constellation, as indicated in FIG. 2 by a broadcast signal 46 being transmitted from an ultimate Iridium LEO satellite 40. A user receiver 60 in a degraded environment with interference, jamming, or attenuation then has access to these GPS data bits. The user receiver may then apply these GPS data bits to the signal processing of its own real time GPS measurements.

Figure 3:
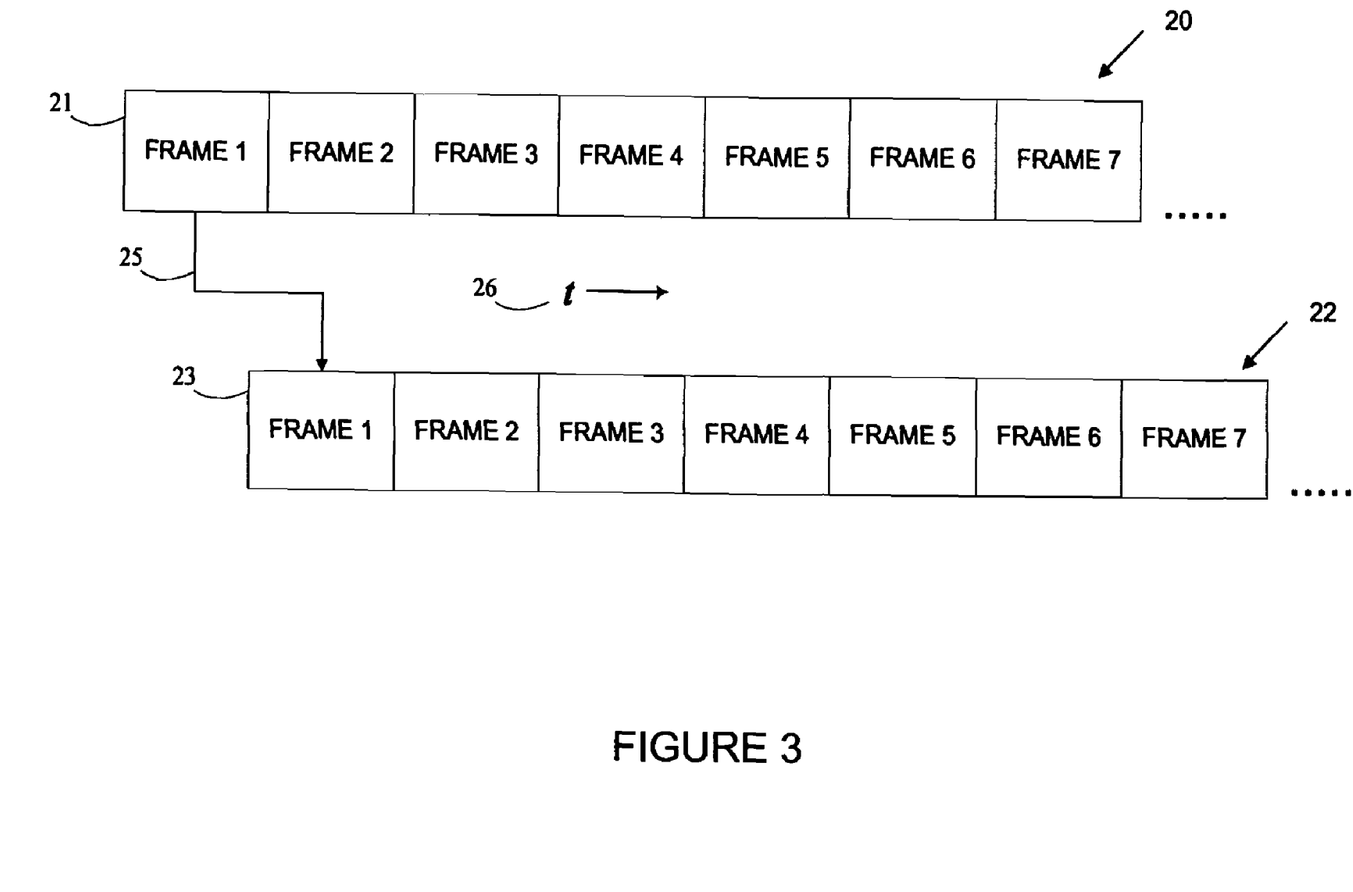
FIG. 3 is an illustration of the timing of real-time and feed-forward GPS signals received by a user.

FIG. 3 conceptually illustrates a 50 bps data stream 20 from a GPS satellite 30a, received in real time at a user 60 (see FIG. 2). The entire GPS navigation message is 25 frames in length, with each frame of the GPS message further divided into 5 subframes that are six seconds, or 300 bits, in length (see FIG. 3). The feed forward data stream 22 from the same GPS satellite 30a contains the identical data, but because of propagation delays through the Iridium system the feed forward stream 22 arrives at the user 60 later than the real time 26 stream 20. As indicated in FIG. 3, the feed forward stream 22 is delayed by a fraction of a single frame 21. The actual delay will vary, depending on user location with respect to the GPS satellite and ground station. As part of the present invention, the feed forward data 23 is then retrieved from the Iridium data stream and time-aligned 25 with the GPS real time data 21 so that it can be used to enhance the real-time data.

Figure 4:
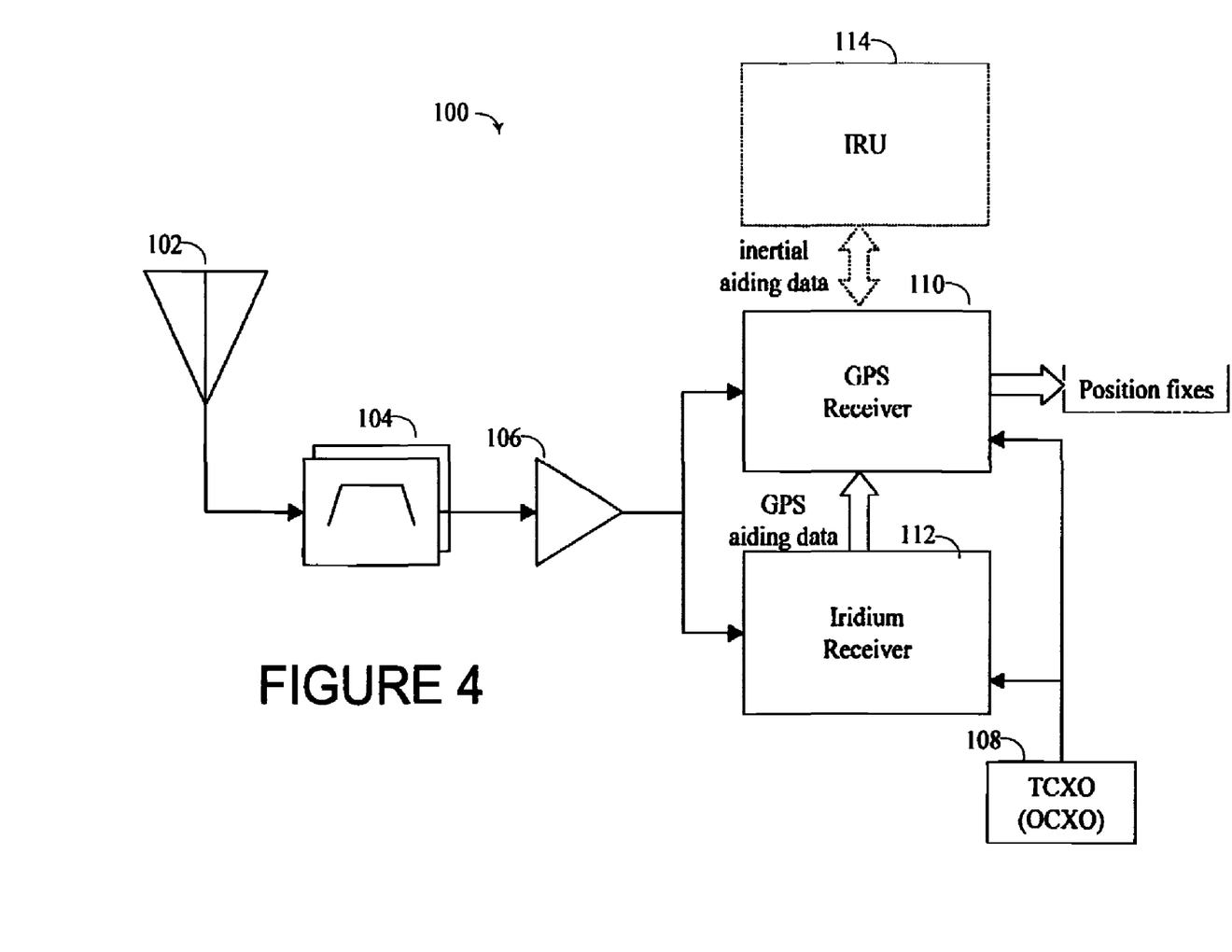
FIG. 4 is a block diagram of a LEO and GPS receiver.

FIG. 4 shows a preferred receiver 100 that receives and demodulates both GPS and Iridium satellite signals. Note that the invention should not be limited to Iridium or any other particular satellite systems. Rather, the system will work equally well by using a receiver for any other satellite system in which GPS data can be retransmitted and fed forward to a user.

The receiver 100 includes a dual band antenna 102, band pass filter 104, and preamp 106. The filter and preamp permit both the L1 and L2 GPS signals to pass along with the Iridium signal, which is close to the L1 signal frequency (1575+/−10.23 MHz for GPS; 1621+/−5 MHz for Iridium). The filtered and amplified signal is passed to a GPS receiver 110 and an Iridium (or other LEO) receiver 112. The Iridium and GPS receivers are tied together with a common clock 108, which is preferably a temperature compensated crystal oscillator.

The GPS receiver 100 produces position fixes as an output, in a manner as discussed above. The GPS receiver also uses GPS aiding data forwarded to it from the Iridium receiver 112 in order to assist in resolving attenuated or missing data at the GPS receiver under interference or jamming conditions. Optionally, the receiver also includes an inertial unit (IRU) 114 in communication with the GPS receiver. The IRU 114 provides inertial motion information to the GPS receiver 110 to enable the GPS receiver 110 to provide accurate and updated position fixes during times of limited data or no data from satellites. Depending on the quality of the IRU, the position fixes from the GPS receiver may continue to be accurate for fairly long periods of time without GPS data following an initial accurate position fix.

Figure 5:
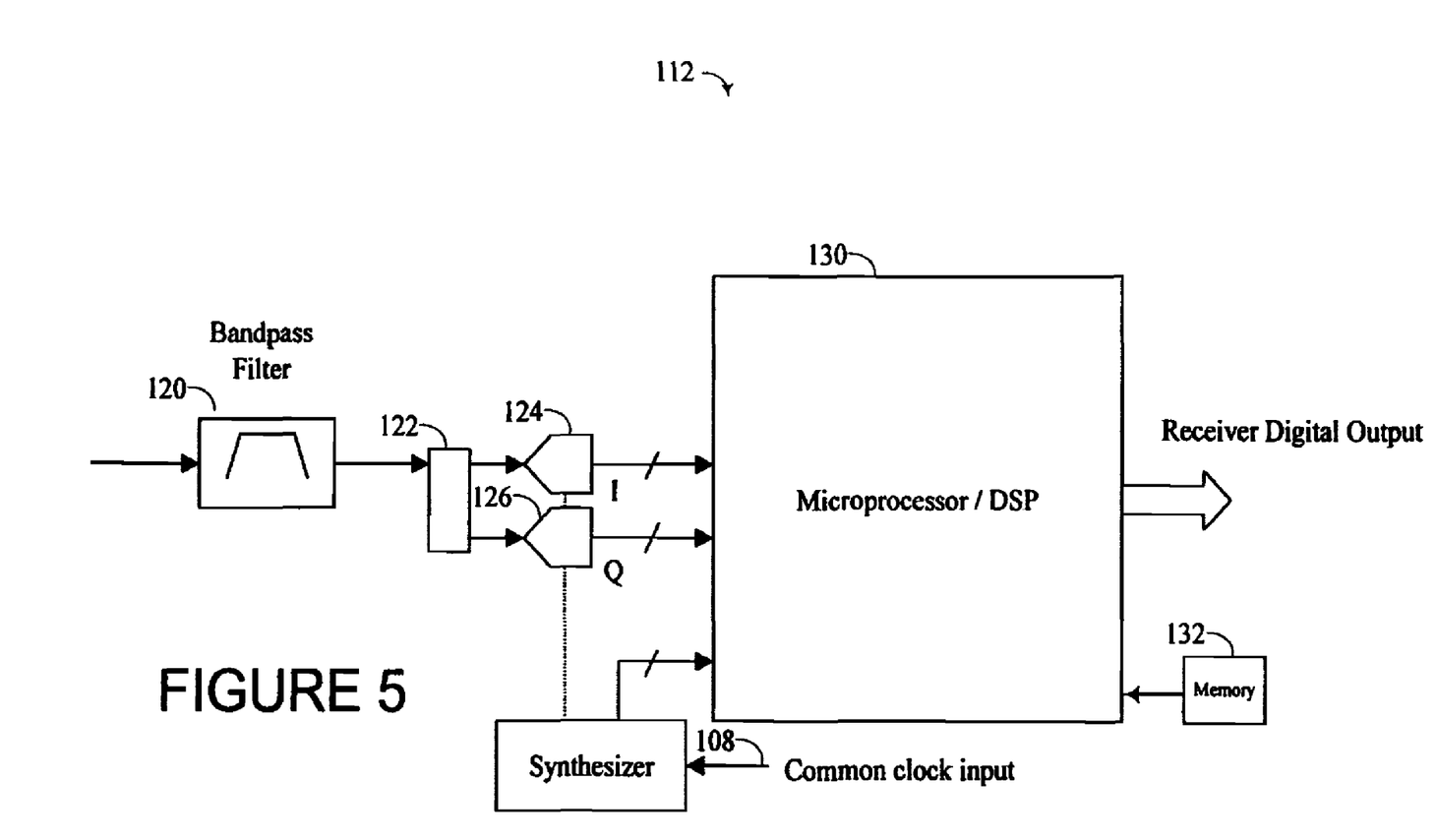
FIG. 5 is a block diagram of a preferred GPS or LEO receiver.

In the preferred embodiment, the satellite signals can be demodulated with a software receiver as shown in FIG. 5. Alternatively, existing Iridium receivers can be obtained and used for this purpose. Nonetheless, the preferred form of this invention employs software for much of the Iridium receiver 112 so as to make it both low cost and easy to maintain and upgrade.

The front end of the receiver includes a bandpass filter 120. The filter 120 has a 10 MHz passband at 1,621 MHz with a steep cutoff, therefore requiring it to be a high Q filter. New technologies allow this sharp filtering to be done at this frequency. The sharp filtering rejects out-of-band interference, such as nearby cellular telephones. An example of the electrical components suitable for this purpose is the specialized RF chip pair contained in IBM GPS receiver IBM43GAENGP0001. This receiver contains an integrated SiGe chip which carries out the bandpass, automatic gain control (AGC), and direct RF sampling functions using 2-bit quantization. Schematically, these functions are illustrated in FIG. 5 as the signal travels from the bandpass filter 120, then is separated into inphase and quadrature components via the hybrid coupler 122. The component signals are passed to inphase and quadrature A/D converters 124, 126. One implementation would be to translate the equivalent design up by 46 MHz to the Iridium band. However, it is not critical that direct downconversion be used. It is also possible to employ a traditional quadrature downconversion scheme.

The A/D converters 124, 126 sample the incoming inphase and quadrature signals at 40 MHz. The output is fed directly into a digital signal processor (DSP) 130 (preferably a TMS 320 DSP) which can then process sections of the data to lock onto the Iridium signal, calculate signal phasing and phase rate, and extract the broadcast bits containing the GPS data fed forward by the Iridium satellite. The GPS data bits from the Iridium broadcast message are demodulated in accordance with the Iridium specification. A memory 132 is also provided to store data and computer programming instructions for processing by the DSP 130. The memory 132 may take any of a variety of forms, such as EEPROM chips or other electromagnetic or optical storage devices.

Figure 6:
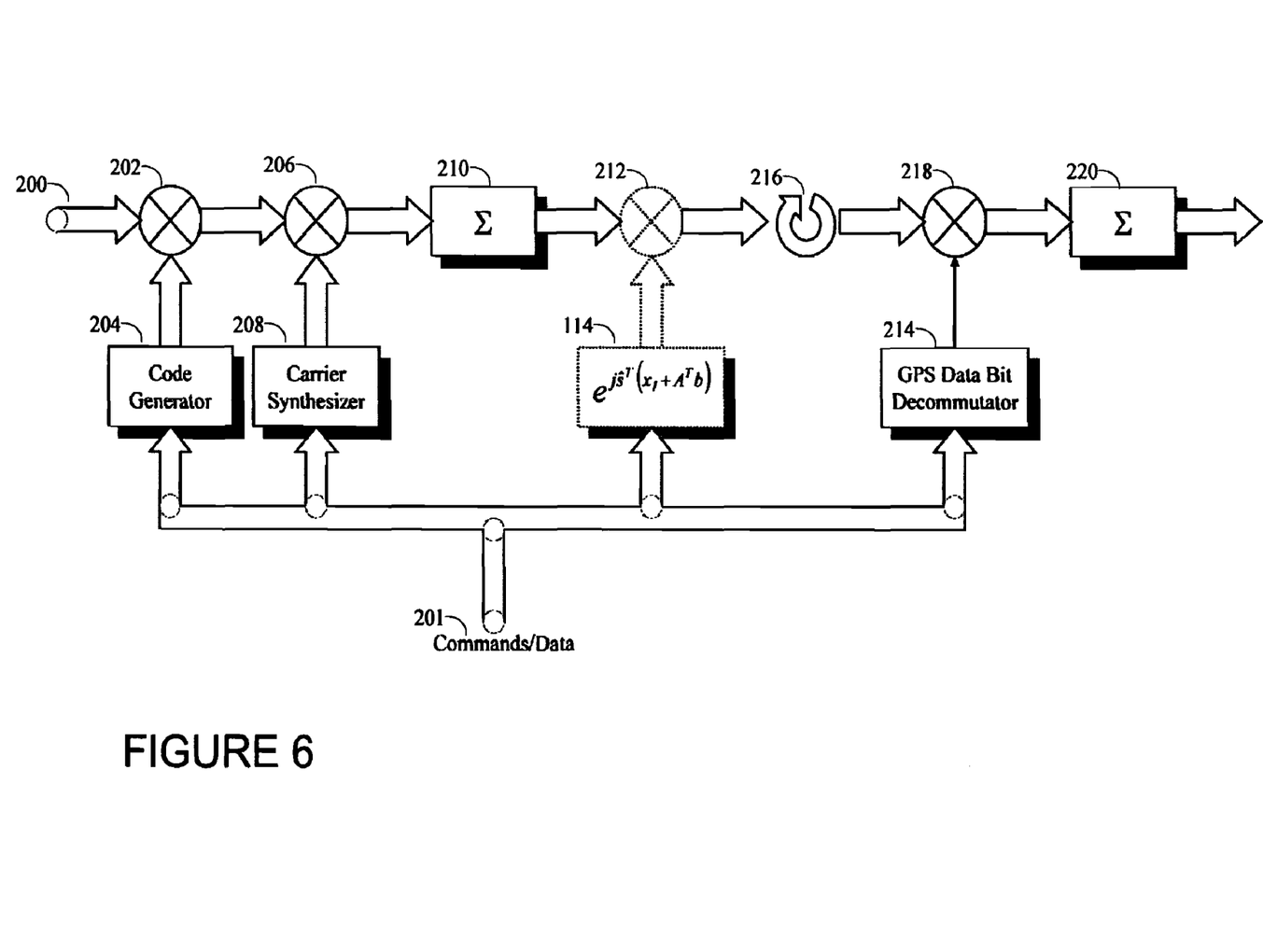
FIG. 6 is a block diagram of the preferred signal processing for a GPS half channel.

FIG. 6 shows how the GPS tracking is implemented for a half channel. The raw, real time digital GPS data measurements 200 are input and mixed at a first mixer 202 with a specific version of the GPS Code provided by a code generator 204, operating on feed forward data 201 obtained from the Iridium satellite. In the preferred embodiment, the code is set to either punctual or early minus late. The use of punctual or early minus late partially determines whether the half channel will accumulate code or carrier errors for the tracking loops. Two identical half channels make up a full channel, as will be described in greater detail below.

The output of the code mixer is mixed again at a second mixer 206 with an internally synthesized version of the GPS carrier generated by the carrier tracking loop of the receiver at a synthesizer 208. An accumulator 210 builds up one millisecond samples of the incoming channel whose boundaries align with the received signal epoch. This integration boundary is chosen to be general enough to handle short overall integration times, such as one millisecond, but to also accommodate longer integration times. According to the GPS signal specification [ICD-200], data bit boundaries will also occur on 20 ms boundaries aligned with the received signal epochs. Therefore, the one millisecond epoch boundary can never cut across a data bit.

For high dynamic applications, an inertial-grade Inertial Reference Unit (IRU) 114 is coupled to the system at a third mixer 212. The inertial is shown in dotted lines because such high performance may not be necessary in all applications. In less demanding applications, a MEMS inertial unit may be sufficient. The IRU senses inertial vector translation, $x_I$, and attitude motion, represented by the 3×3 attitude rotation matrix A, of the user platform. With prior knowledge of the antenna mounting lever arm, b, with respect to the body frame of the user platform, it is possible to use the inertial to project the antenna motion into the line of sight of the satellite, $\hat{s}$, to yield a complex, real-time phase correction for each channel. The net effect is to subtract out short-term user motion and enable long integration times on the GPS signal.

The Iridium receiver demodulates the feedforward GPS data bits for all the GPS satellites in view via the Iridium system. A decommutator 214 in the user receiver sorts out the incoming bit stream within the Iridium data frame and positions the reference GPS bits in proper phasing for each channel. To keep track of delays, the GPS data is time tagged according to the GPS time at which it was broadcast from the GPS satellite. In general, these GPS data bits are subject to a latency of around 80 ms as they propagate through space from the GPS satellite to the ground reference receiver. An additional latency of order 10-90 ms from the time they are received at the ground reference station will accrue from transmission to the user from the ground station due to propagation delay through the Iridium system.

To ensure that the real-time GPS data bits are appropriately delayed and aligned in time with the decommutated feedforward data bits produced at a decommutator 214, a first-in-first-out (FIFO) synchronization buffer 216 is employed, receiving and buffering data from the accumulator (optionally mixed with the IRU data). The GPS time tags on each data stream are used to ensure that the same millisecond epochs of data are mixed together. The FIFO 216 holds each batch of millisecond measurements from the accumulators until they are exactly time aligned with the incoming data bits from Iridium. Then, the Iridium data bit stream is used to wipe off the 50 bps data modulation from the incoming GPS signal at a fourth mixer 218. The result is a true coherent GPS carrier phase detector, at accumulator 220, extendible from 1 ms to longer integration times that are limited by the quality of the inertial unit—potentially 10 seconds for an inertial grade unit.

Figure 7:
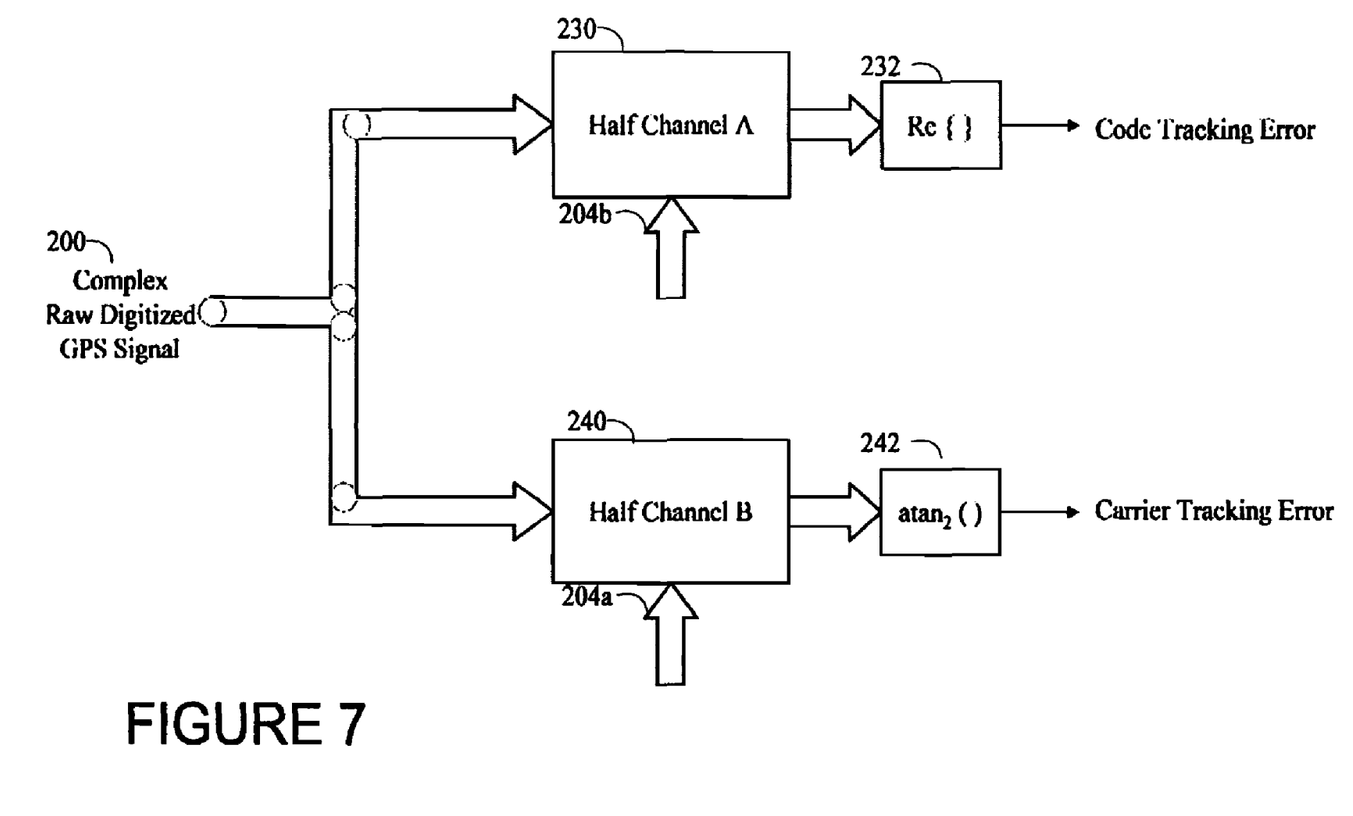
FIG. 7 is a block diagram for a GPS receiver for processing a single channel.

Each channel is formed by two half channels. As shown in FIG. 7, the output for each half channel may be interpreted as follows: if the half channel code generator is commanded to synthesize an early minus late code sequence 204b, then the real component 232 of the output of that half channel 230 will correspond to the code phase tracking error for that satellite. If the half channel code generator is commanded to synthesize a punctual code sequence 204b, then the output 242 of that half channel 240 will correspond to the carrier phase error.

Figure 8:
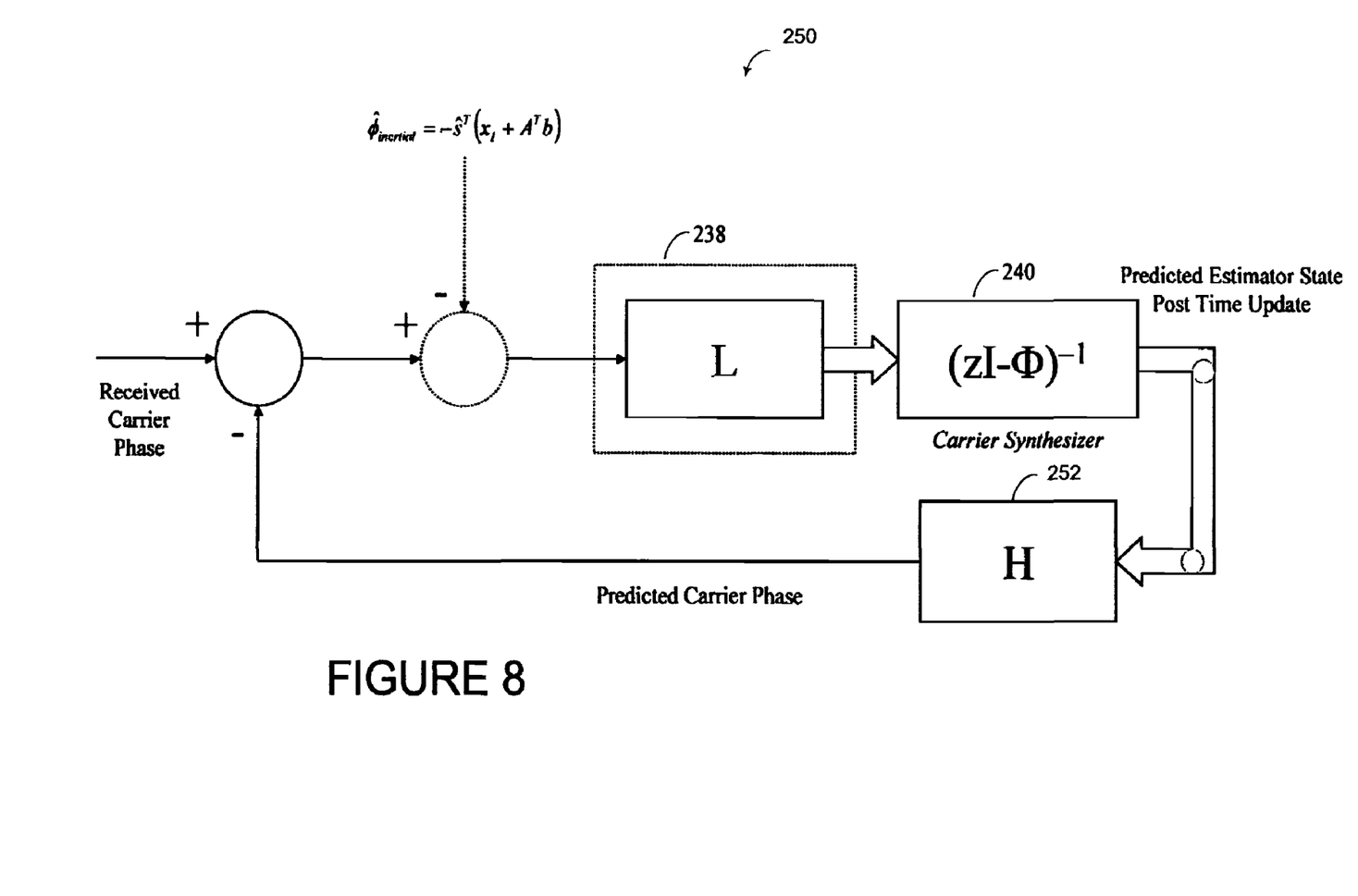
FIG. 8 is a block diagram of a GPS carrier tracking loop estimator model.

The resulting carrier phase tracking error is fed into the estimator 250 shown in FIG. 8. This general-purpose estimator is capable of estimating the carrier phase and any number of its time derivatives upon receipt of the latest phase tracking error measurement, $\Delta_\phi$. In the preferred embodiment, a third order tracking loop is implemented—mostly to take into account satellite orbital motion. Therefore, there are three states, $\phi$, to the tracking loop estimator/synthesizer: phase, phase velocity, and phase acceleration. The following matrix dynamic model, $\Phi$, is employed to model the carrier phase synthesizer in its progress from the a posteriori estimate at one epoch to the a priori estimate at the next:

$$\begin{bmatrix} \varphi \\ \dot{\varphi} \\ \ddot{\varphi} \end{bmatrix}_{k+1} = \Phi \begin{bmatrix} \hat{\varphi} \\ \hat{\dot{\varphi}} \\ \hat{\ddot{\varphi}} \end{bmatrix}_k = \begin{bmatrix} 1 & T & \frac{1}{2}T^2 \\ 0 & 1 & T \\ 0 & 0 & 1 \end{bmatrix} \begin{bmatrix} \hat{\varphi} \\ \hat{\dot{\varphi}} \\ \hat{\ddot{\varphi}} \end{bmatrix}_k$$

The sole observable, as encoded in the observability matrix H=[1 0 0], is the measured tracking error, $$\Delta \varphi_k = \varphi_k - [1 \ 0 \ 0] \begin{bmatrix} \overline{\varphi}_k \\ \dot{\overline{\varphi}}_k \\ \ddot{\overline{\varphi}}_k \end{bmatrix} = \varphi_k - \overline{\varphi}_k$$

Using optimal estimation theory, an optimal gain, L, may be chosen to yield a measurement update equations as follows from the tracking error:

$$\begin{bmatrix} \hat{\varphi} \\ \hat{\dot{\varphi}} \\ \hat{\ddot{\varphi}} \end{bmatrix}_k = \begin{bmatrix} \overline{\varphi} \\ \dot{\overline{\varphi}} \\ \ddot{\overline{\varphi}} \end{bmatrix}_k + \begin{bmatrix} L_1 \\ L_2 \\ L_3 \end{bmatrix} \Delta \varphi_k$$

Each epoch this correction vector is sent to the carrier phase synthesizer 252 to adjust its advance. The end result is an effectively optimal carrier phase tracking loop. Care must be taken to ensure that the latency from Iridium does not amount to a significant portion of the sample interval. If this must be the case, then it may be advisable to implement a dynamic model that takes into account the delay. Also, in the preferred embodiment, the carrier phase synthesizer effectively provides third order functionality from one integration interval to the next. The reason for this is to cover those cases where the integration interval becomes significant with respect to one second.

Figure 9:
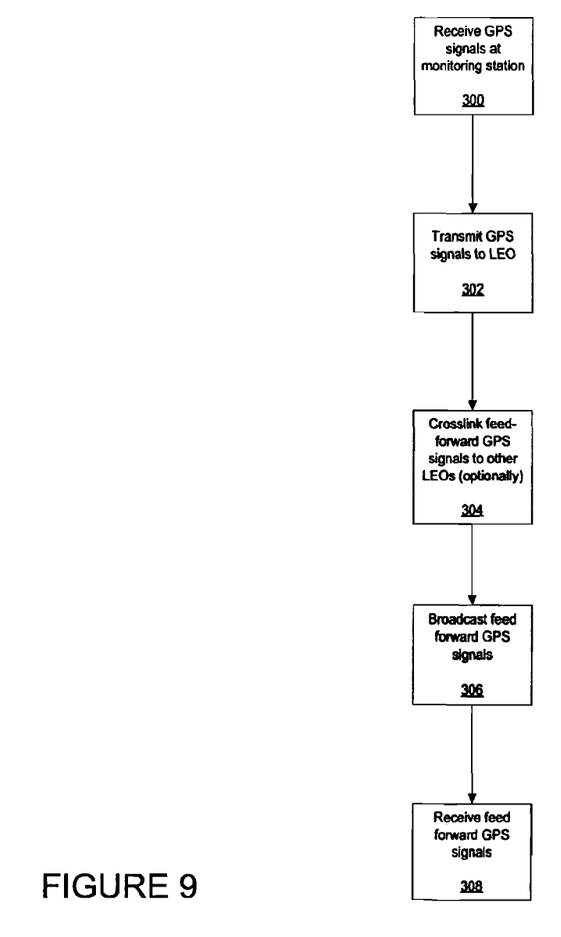
FIG. 9 is a flow diagram of a preferred method in accordance with the present invention.
Figure 10:
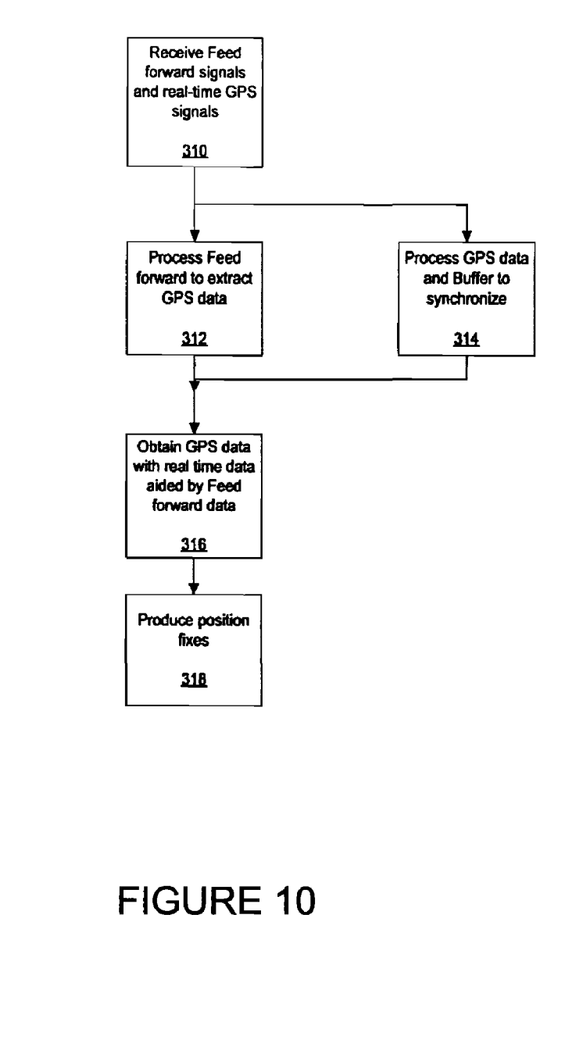
FIG. 10 is a flow diagram of a preferred method in accordance with the present invention.

The method for implementing the present invention is further described with references to FIGS. 9 and 10. In a first step 300, a monitoring station, such as a ground monitoring and control station 50 (see FIG. 2) receives GPS signals from those GPS satellites in its field of view. The monitoring station modulates those signals in accordance with the Iridium satellite specification and transmits the received and modulated GPS data to an Iridium satellite in a second step 302. It should be understood that other LEO satellites other than Iridium may be used.

Once received by an initial Iridium satellite, at a next step 304 the GPS feed-forward data is cross-linked to other Iridium satellites. Any number of cross-linkings of the feed forward data may occur, including no cross-links at all, consistent with this invention. Ultimately, the feed forward data is broadcast toward the earth 306 for receipt by any number of users, who receive the feed forward data at a final step 308.

With reference to FIG. 10, the user receives real time GPS signals and feed forward GPS data via the Iridium satellite, at step 310. The user receiver processes both data streams, extracting the feed forward GPS data at a step 312 and, generally in parallel, processing the real time GPS data and buffering it at a step 314 in order to synchronize it with the feed forward data. The feed forward data is then used to supplement the real time data 316, enabling the system to obtain and use accurate GPS data at the user even under jamming or interference conditions. Finally, the receiver produces position fixes 318 from the processed GPS data, optionally aided by an inertial reference unit.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising:
   receiving a real-time GPS data stream from a satellite in a first GPS satellite network;
   receiving a feed-forward data stream from a satellite in a second satellite network different from the first GPS satellite network, the feed-forward data stream containing feed-forward GPS data that is identical to real-time GPS data contained by the GPS data stream and wherein the feed-forward data stream was previously received at the second satellite network from a ground control station, the feed-forward data stream being received at a later time than the real-time GPS data stream; and
   processing, using a digital signal processor, the real-time GPS data stream and the feed-forward data stream, the processing including:
      extracting feed-forward GPS data bits from the feed-forward data stream; and
      supplementing the real-time GPS data with the extracted feed-forward GPS data bits, at least where the real-time GPS data is impaired due to missing or attenuated data bits in the real-time GPS data stream.

2. The method of claim 1, wherein the real-time GPS data is impaired as a result of at least one of jamming, RF interference, or structural interference.

3. The method of claim 1, wherein the step of processing comprises synchronizing the real-time GPS data with the feed-forward GPS data.

4. The method of claim 1, wherein the step of processing comprises demodulating the feed-forward data stream.

5. The method of claim 1, further comprising receiving and processing at least one additional real-time GPS data stream, and at least one additional feed-forward data stream.

6. The method of claim 1, wherein the feed-forward data stream is cross linked to satellites in the second satellite network.

7. The method of claim 1, wherein the second satellite network comprises a low earth orbit satellite network.

8. The method of claim 1, and further comprising:
   using the supplemented real-time GPS data to produce a position fix.

9. The method of claim 1 wherein the step of processing further comprises time-aligning the real time GPS data stream and the feed-forward data stream.

10. A device comprising:
    a first receiver configured to receive a real-time GPS signal from a GPS satellite in a first GPS satellite network;
    a second receiver, coupled to the first receiver, configured to receive a feed-forward GPS signal from a second satellite in a low earth orbit satellite network different from the GPS satellite network, and wherein the feed-forward GPS signal was previously received at the second satellite from a ground control station, the feed-forward GPS signal containing identical GPS data as the real-time GPS signal but being received at a later time than the real-time GPS signal; and
    a digital signal processor configured to process the real-time GPS signal and the feed-forward GPS signal, the processing including extracting feed-forward GPS data bits from the feed-forward GPS signal, and supplementing real-time GPS data in the real-time GPS signal with the extracted feed-forward GPS data bits, at least where the real-time GPS signal is impaired due to missing or attenuated data bits in the real-time GPS data signal.

11. The device of claim 10, further comprising an antenna configured to receive transmissions from the GPS satellite and from the second satellite; and an inertial reference unit configured to sense a motion of the antenna, the digital signal processor configured to project the motion of the antenna into line of sight of the GPS satellite to yield phase correction.

12. The device of claim 11, further comprising a filter in signal communication with the antenna, and a pre-amplifier in signal communication with the filter, the first receiver and the second receiver.

13. The device of claim 10, wherein the digital signal processor includes a synchronization buffer configured to synchronize the real-time GPS signal with the feed-forward GPS signal.

14. The device of claim 13, further comprising a common clock coupled to the first receiver and the second receiver.

15. The device of claim 10, wherein the digital signal processor is configured to time align the real-time GPS signal with the feed-forward GPS signal.

16. The device of claim 10, further comprising an inertial reference unit configured to produce a position fix using the supplemented real-time GPS signal.

17. A method comprising:
    receiving a real-time GPS data stream from a satellite in a first GPS satellite network;
    receiving a feed-forward data stream from a satellite in a second satellite network different from the first GPS satellite network, the feed-forward data stream containing feed-forward GPS data that is identical to real-time GPS data contained by the GPS data stream, and wherein the feed-forward data stream was previously received at the second satellite network from a ground control station, the feed-forward data stream being received at a later time than the real-time GPS data stream; and
    processing, using a digital signal processor, the real-time GPS data stream and the feed-forward data stream, the processing including:
       extracting feed-forward GPS data bits from the feed-forward data stream; and
       supplementing the real-time GPS data with the extracted feed-forward GPS data bits, so as to fill in gaps in the real-time GPS data only where the real-time GPS data is impaired due to missing data bits in the real-time GPS data stream.

18. The method according to claim 17 wherein the step of processing further comprises demodulating the feed-forward data stream and synchronizing the real-time GPS data with the feed-forward GPS data.

19. The method according to claim 17 wherein the feed forward data stream is received at the ground control station from a GPS satellite in the first GPS satellite network.

20. The method according to claim 17 wherein the second satellite network comprises a low earth orbit satellite network.

* * * * *